(12) United States Patent
Matsuo

(10) Patent No.: US 6,331,980 B1
(45) Date of Patent: Dec. 18, 2001

(54) SWITCHING EQUIPMENT CAPABLE OF TRANSFERRING PRIORITY INFORMATION AND PRIORITY CONNECTING METHOD

(75) Inventor: Shinichiro Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,436

(22) Filed: Mar. 19, 1998

(30) Foreign Application Priority Data

Oct. 8, 1997 (JP) .................................................... 9-275844

(51) Int. Cl.[7] .................................................... H04L 12/66
(52) U.S. Cl. ............................................. 370/395; 370/466
(58) Field of Search .................................... 370/466, 467, 370/522, 904, 395, 400, 465

(56) References Cited

U.S. PATENT DOCUMENTS

| | | | | |
|---|---|---|---|---|
| 5,425,029 | * | 6/1995 | Hluchyj et al. | 370/389 |
| 5,434,852 | * | 7/1995 | La Porta et al. | 370/467 |
| 5,509,010 | * | 4/1996 | La Porta et al. | 370/467 |
| 5,724,351 | * | 3/1998 | Chao et al. | 370/395 |
| 5,917,824 | * | 6/1999 | Brueckheimer et al. | |
| 5,991,532 | * | 11/1999 | Harada | 370/395 |

* cited by examiner

Primary Examiner—Ricky Ngo
(74) Attorney, Agent, or Firm—Helfgott & Karas, P.C.

(57) ABSTRACT

A traveling class mark information element in an N-ISDN message can be mapped to a QOS of a B-ISDN message to make a conventional network (e.g., N-ISDN) priority service executable in a B-ISDN with a spread of the B-ISDN.

6 Claims, 18 Drawing Sheets

FIG. 16

| 8 | 7 | 6 | 5 | 4 | 3 | 2 | 1 |

| CALL-OUT USER CLASSIFICATION | 1 |

00000000   UNKNOWN CALL-OUT CLASSIFICATION
00000001   BASE, FRENCH
.
.
00000101   BASE, SPANISH
.
.
00001001   DEFERRED
00001010   GENERAL CALL-OUT USER
00001011   PRIORITY CALL-OUT USER
00001100   DATA CALL (VOICE BAND DATA)
00001101   TEST CALL
.

SWITCHING EQUIPMENT CAPABLE OF TRANSFERRING PRIORITY INFORMATION AND PRIORITY CONNECTING METHOD

BACKGROUND OF THE INVENTION

The present invention relates to a technology effective in an application to signal message converting control of a switching equipment for attaining a relay between a narrowband ISDN (N-ISDN) network and a broadband ISDN (B-ISDN).

With a progress and a wide-spread of a technology of an asynchronous transfer mode communication system in recent years, a relay network based on a conventional time division multiplexing (TDM) system has increasingly shifted to a relay network using an ATM line. With this shift, there were made a variety of proposals of a relaying system (disclosed in e.g., Japanese Patent Laid-Open No. 6-232911 etc) from the N-ISDN to the B-ISDN. It is, however, indispensable that communication services (such as, e.g., providing a connection to a priority class terminal) provided in the conventional N-ISDN be also actualized in the B-ISDN.

A notifying method of communication service information between the B-ISDN and the N-ISDN in the prior art, will be explained with reference to the drawings.

As shown in FIG. 2, a permanent virtual channel (PVC) is set as a communication connection between N-ISDN switching equipments (202a, 202b) preset as terminals of B-ISDN switching equipments (201a, 201c) in order to transmit and receive an N-ISDN signal message (information for implementing the communication service) in the B-ISDN. Then, when an N-ISDN call occurs, call setting information is transmitted by use of a present PVC from the call-out N-ISDN switching equipment (202a), and communication service information such as priority class terminal information etc is set therein, whereby the N-ISDN switching equipment (202b) becoming a last call-in station is notified of the priority class terminal information.

On the other hand, for receiving the priority communication services prescribed in the B-ISDN, a quality of service (QOS) must be designated when setting the PVC. For this purpose, as shown in FIG. 3, it is required that the PVC exhibiting a high QOS be previously connected to the call-out from the priority class terminal accommodated in the call-out N-ISDN switching equipment (202a) in order to have the B-ISDN priority communication service received. Then, in the B-ISDN, if the call from the terminal connected to the N-ISDN switching equipment (202a) is recognized as a call transmitted from the priority class terminal, a priority connection in the B-ISDN is actualized by use of the previously-connected PVC.

According to the prior art, however, the PVC in the B-ISDN transmits and receives a cell when set as shown in FIG. 3, and hence there arises a problem in which a band in the B-ISDN is used with a futility even when any call does not occur from the N-ISDN switching equipment (202a).

To obviate the problem described above, it can be considered that the N-ISDN signal message is transmitted and received by use of an SVC connection. In this case, an ITU-T (Q.2931) and an ATM forum (UNI4.0) give such a advise that the last call-in N-ISDN switching equipment be notified of intrinsic information such as the priority class terminal information etc by use of an extended information field defined in the B-ISDN signal message.

Note that the QOS of SETUP is provided with 5-stage classes, a and "class 1" is designated as a contrivance for designating communication priority control in the B-ISDN relay network in the case of the ATM forum (UNI4.0), "class 1" is able to receive the priority control service of an ATM layer more preferentially than other classes (e.g., classes 2, 3, 4 and 0). In order to actualize this between the N-ISDN and the B-ISDN, there are required to provide two devices, i.e., a device for notifying the intrinsic information such as the priority class terminal information etc, and another device for designating the communication priority control in the B-ISDN.

Accordingly, it is a primary object of the present invention, which was devised in view of the above points, to effectively actualize a transmission of the priority information with a simple construction between two kinds of networks having different protocols.

SUMMARY OF THE INVENTION

According to a first aspect of the present invention, a switching equipment for relaying first and second networks having different protocols, comprises a receiving message control unit for extracting priority information of a call-out terminal from a first message format received from the first network, a main control unit for converting the priority information obtained from the receiving message control unit into a second message format, and a transmitting message control unit for transmitting to the second network the priority information converted into the second message format.

A "call-out from priority terminal" can be thereby conveyed from the first network to the second network.

According to a second aspect of the invention, the first network is an N-ISDN, and the priority information is call-out terminal regulation class information based on Q.931-a. Further, the second network is a B-ISDN, and the priority information after being converted is a QOS class prescribed in an ATM forum (UNI4.0).

The main control unit converts the information into UNI4.0 from Q.931-a, whereby the priority connection actualized in the N-ISDN can be executed also in the B-ISDN.

According to a third aspect of the invention, the first network is a B-ISDN, and the priority information is a QOS class prescribed in an ATM forum (UNI4.0). Moreover, the second network is an N-ISDN, and the priority information after being converted is call-out terminal regulation class information based on Q.931-a.

The main control unit converts the information into Q.931-a from UNI4.0, whereby the priority connection actualized in the B-ISDN can be executed also in the N-ISDN.

According to a fourth aspect of the invention, the first or second network is a B-ISDN, and the priority information before or after being converted is a QOS class prescribed in an ATM forum (UNI4.0). Then, the second or first network is a No.7 common line system relay network, and the priority information before or after being converted is a call-out user priority parameter.

The information on the "call-out from priority terminal" in, e.g., the common line system relay network can be transmitted to the B-ISDN, and the information on the "call-out from priority terminal" in the B-ISDN can be transmitted to the common line system relay network.

According to a fifth aspect of the invention, the first or second network is a B-ISDN, and the priority information before or after being converted is a QOS class prescribed in an ATM forum (UNI4.0). Then, the second or first network is an individual line system network, and the priority information before or after being converted is a dial to which a special numeral is added.

With this structure, it is feasible to set the QOS such as QOS=1 in the B-ISDN by adding a special numeral, e.g., "1" to the head of the dial number, and the information with a purport of being the "call-out from priority terminal" can be transmitted to the B-ISDN.

BRIEF DESCRIPTION OF THE DRAWINGS

Other objects and advantages of the present invention will become apparent during the following discussion in conjunction with the accompanying drawings, in which:

FIG. 16 is an explanatory diagram showing a call-out user classification indicating parameter pursuant to Q.763 in the embodiment;

DETAILED DESCRIPTION OF THE PREFERRED EMBODIMENTS

Embodiments of the present invention will hereinafter be described with reference to the accompanying drawings.

To start with, a principle of the present invention will be explained referring to FIGS. 4–7, and thereafter the embodiments will be discussed in greater details.

Figure 1:
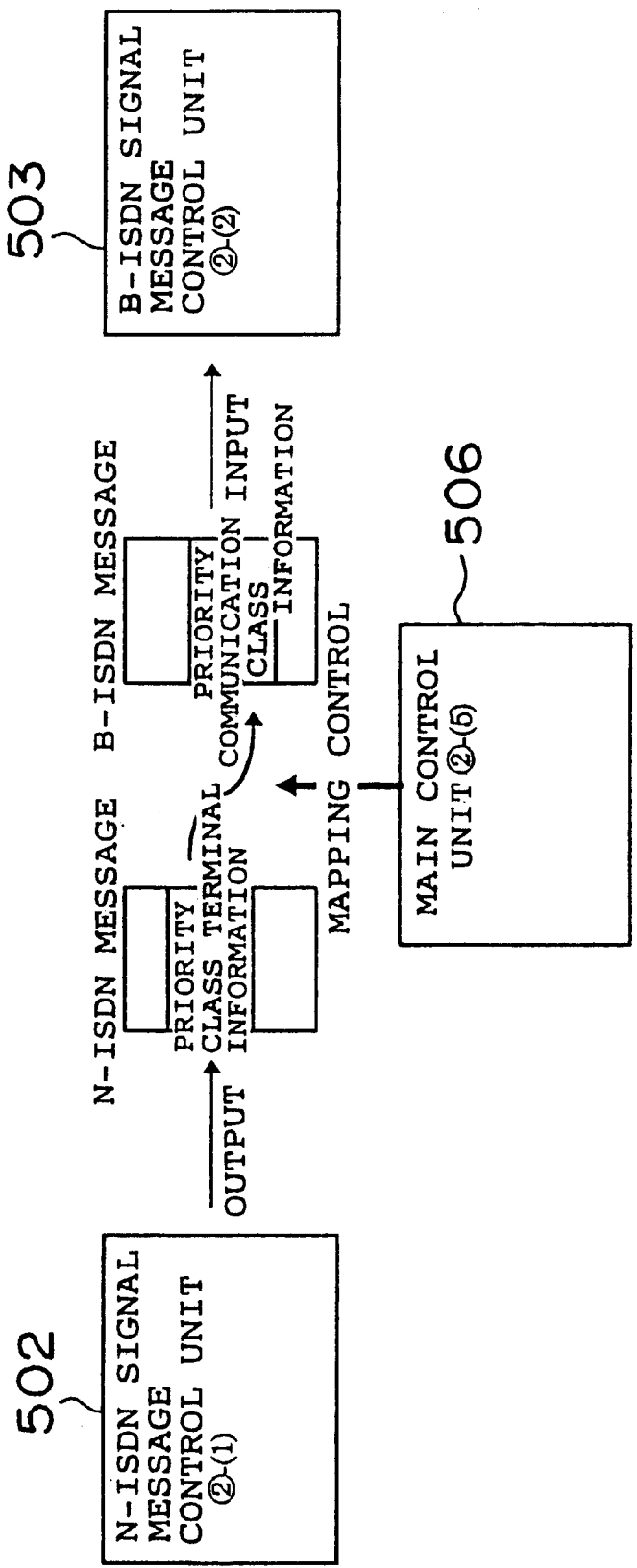
FIG. 1 is a block diagram showing a mapping status of a message format from an N-ISDN to a B-ISDN in an embodiment.
Figure 2:
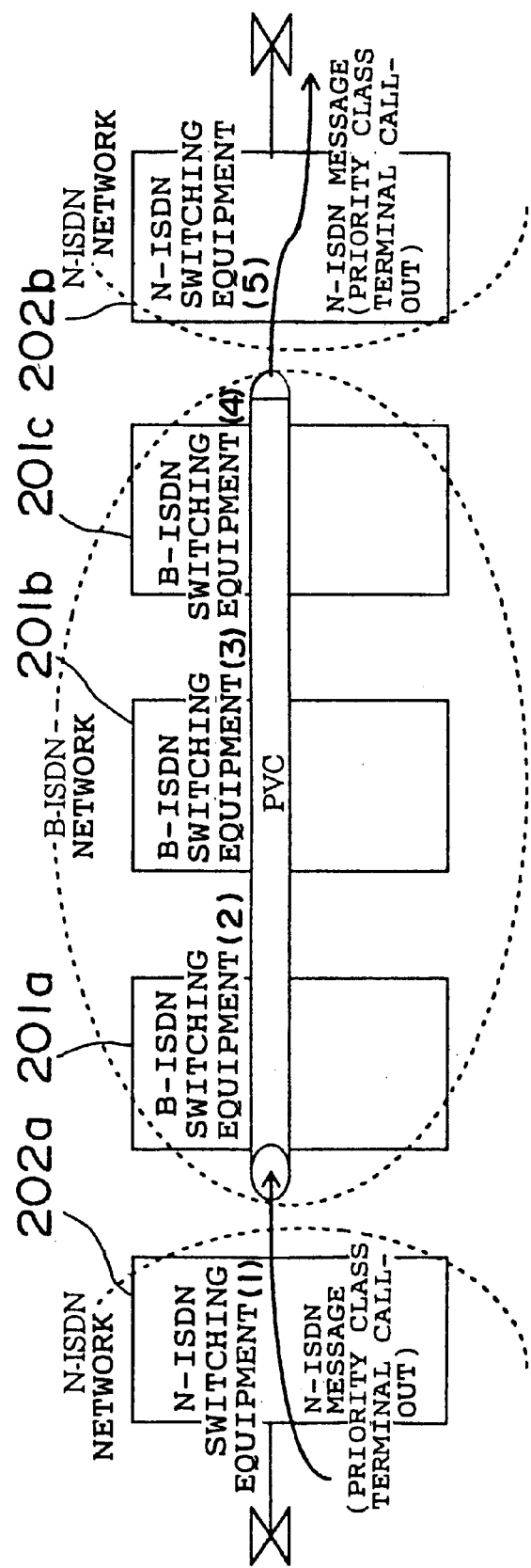
FIG. 2 is a block diagram illustrating network constructions of the N-ISDN and the B-ISDN.
Figure 3:
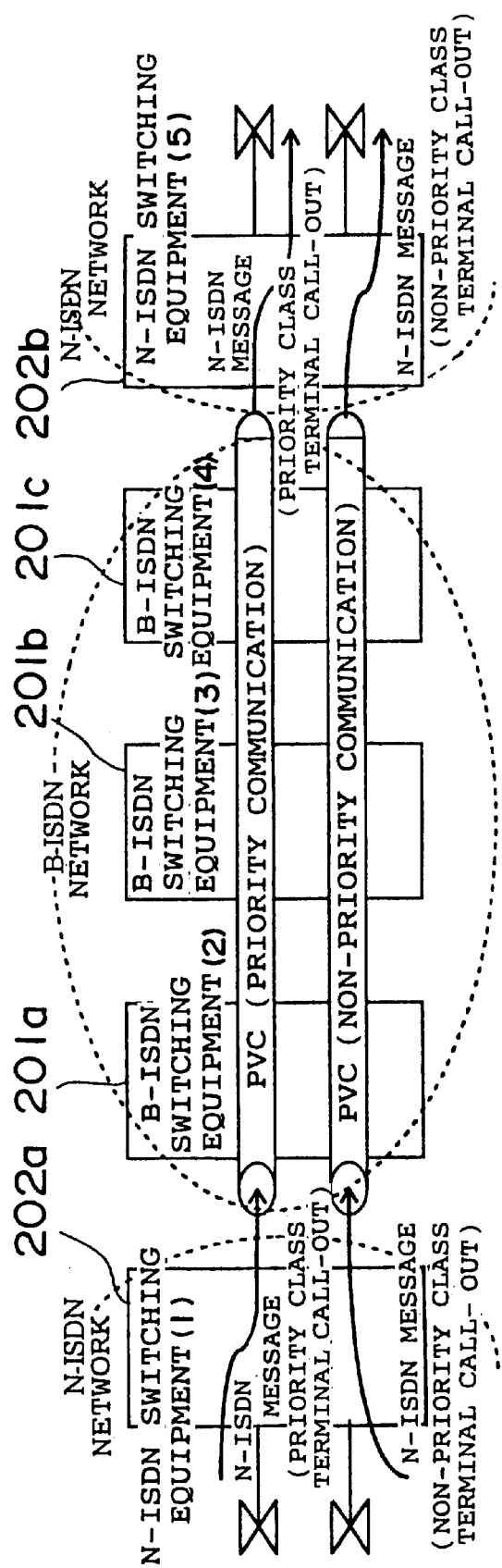
FIG. 3 is a block diagram illustrating the network constructions of the N-ISDN and the B-ISDN.
Figure 4:
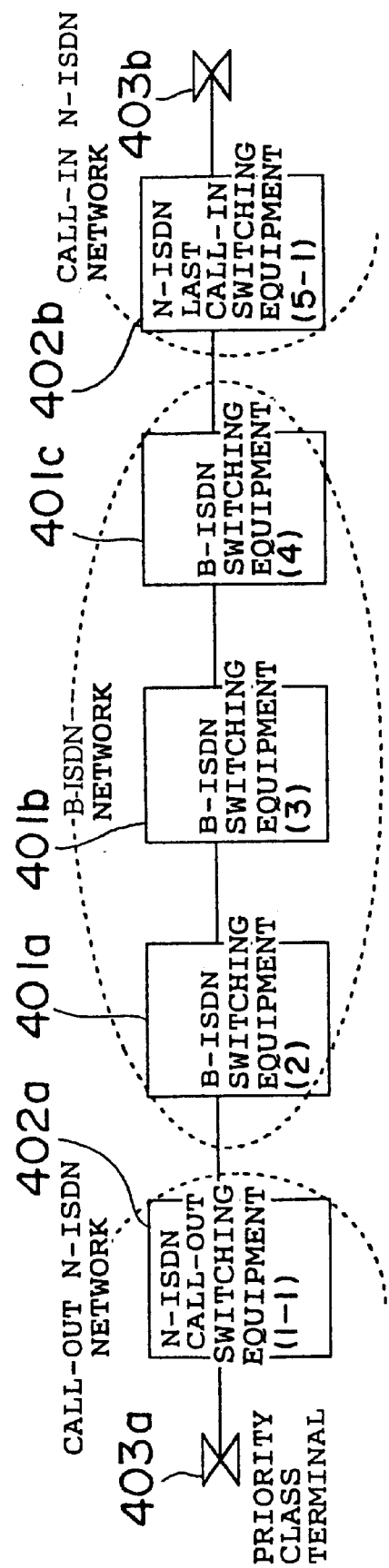
FIG. 4 is a block diagram showing the network constructions of the N-ISDN and the B-ISDN in the present embodiment.

FIG. 4 shows a whole construction of a network according to the present invention. A priority class terminal 403a is connected to an N-ISDN switching equipment 402a on a call-out side. The call-out N-ISDN switching equipment 402a is connected to a B-ISDN switching equipment 401a. The B-ISDN is connected via B-ISDN switching equipments 401b, 401c to an N-ISDN switching equipment 402b on a call-in side, and a call-in terminal 403b is connected to this N-ISDN switching equipment 402b.

Figure 5:
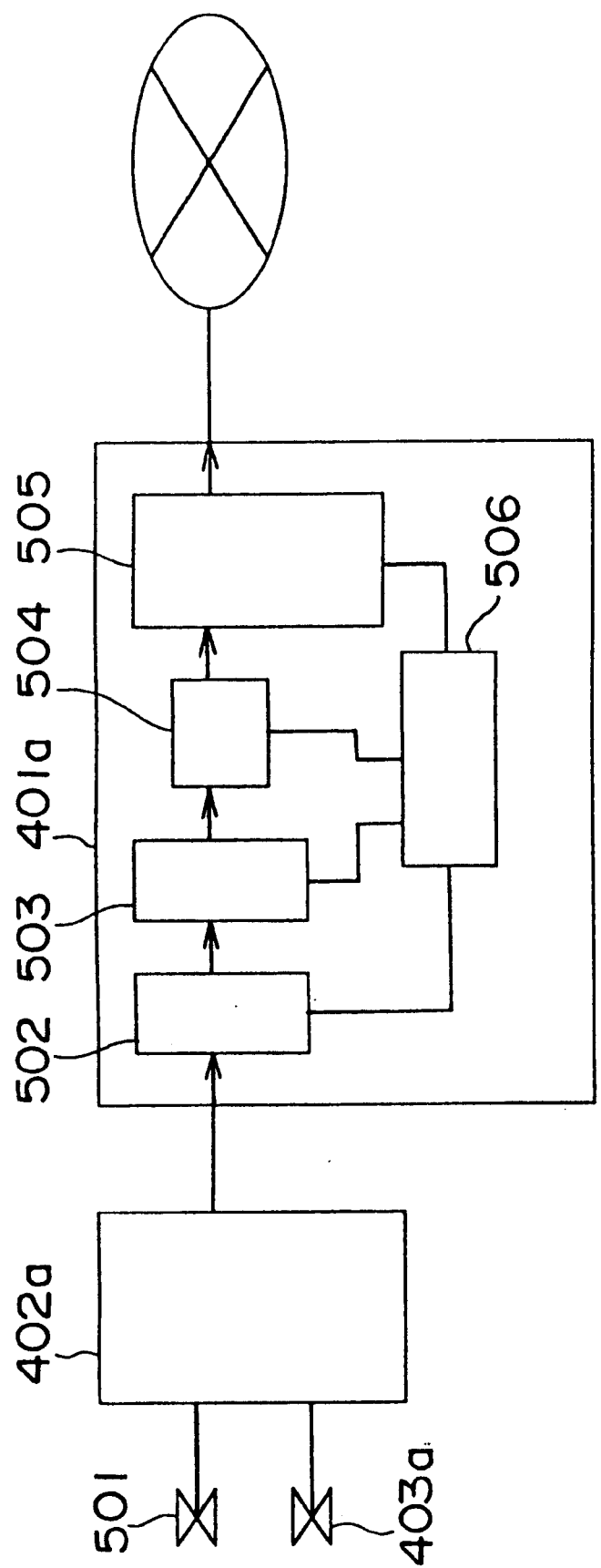
FIG. 5 is a block diagram showing functional structure within a switching equipment in the embodiment.

FIG. 5 illustrates in greater details a connecting structure between the call-out N-ISDN switching equipment 402a and the B-ISDN switching equipment 401a. Referring to FIG. 5, a general terminal 501 and an N-ISDN terminal 403a are connected to the N-ISDN switching equipment 402a.

The B-ISDN switching equipment 401a includes an N-ISDN signal message control unit 502 incorporating an N-ISDN signal message I/O function and an N-ISDN protocol control function, a B-ISDN signal message control unit 503 incorporating a B-ISDN signal message control I/O function and a B-ISDN protocol control function, a cell assembly/decomposition control unit 504 for converting a TDM signal into a cell, an ATM switch control unit 505 incorporating a using quantity parameter control function and a cell shaping function, and a main control unit 506 for controlling these units.

Referring to FIG. 5, the construction of the call-out B-ISDN switching equipment has been explained by exemplifying the switching equipment 401a, and it should be assumed that the call-in B-ISDN switching equipment (designated by 401c in FIG. 4) has also the same construction.

Using this construction, there will be described the principle on which the B-ISDN switching equipment 401a executes a process of a call transmitted from a priority class terminal 403a accommodated in the call-out N-ISDN switching equipment 402a.

Figure 6:
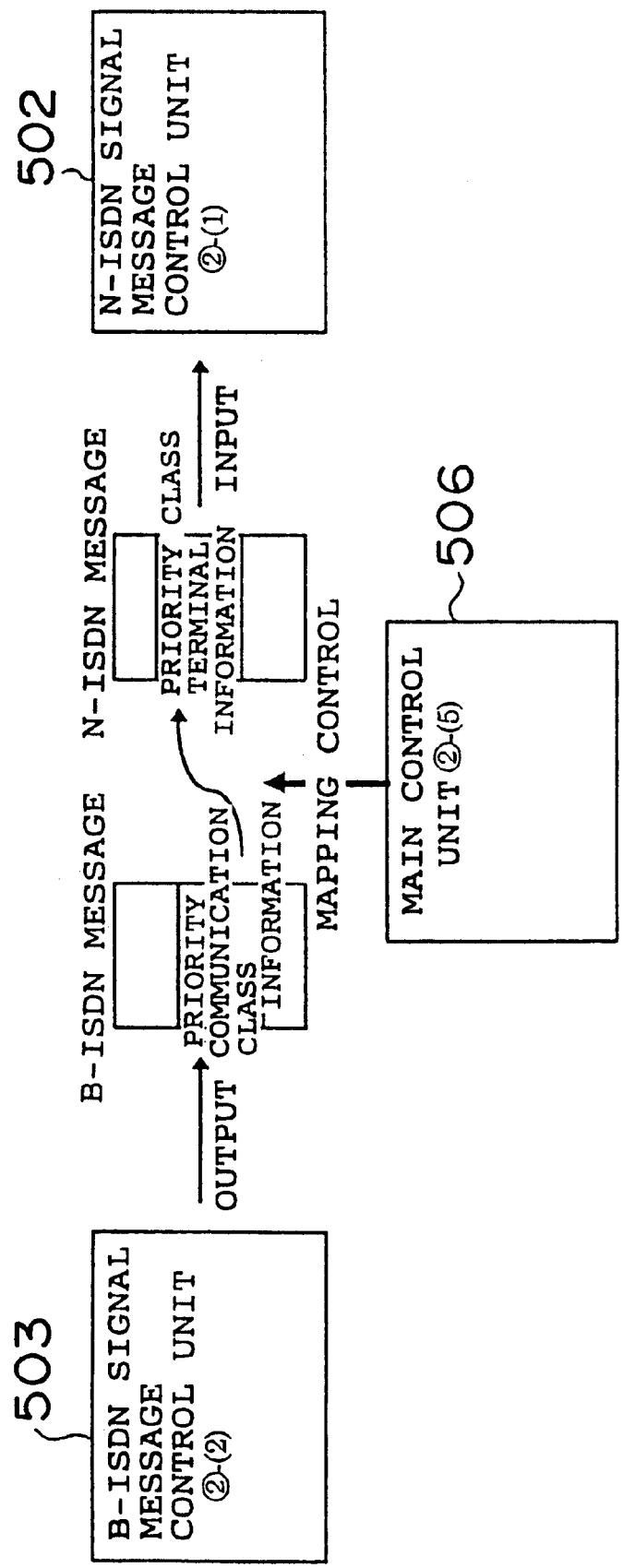
FIG. 6 is a block diagram showing a mapping status of the message format from the B-ISDN to the N-ISDN.

As illustrated in FIG. 6, the main control unit 506 of the B-ISDN switching equipment 401a maps, to a B-ISDN signal message, priority class terminal information within the N-ISDN signal message outputted from the N-ISDN signal message control unit 502, and inputs this mapped message to the B-ISDN signal message control unit 503.

Thus, the priority class terminal information, e.g., "class 1 (the highest priority class)" defined as a parameter within the N-ISDN message outputted from the N-ISDN ISDN signal message control unit 502, is set to priority communication class information "class 1 (the highest priority communication class)" defined as a parameter of the B-ISDN message inputted to the B-ISDN signal message control unit 503 under control of the main control unit 506. The B-ISDN can be thereby notified of the priority class terminal information of the call-out terminal 403a accommodated in the N-ISDN switching equipment, and further a priority control service for communications in the B-ISDN can be received.

On the other hand, when the call-in B-ISDN switching equipment 401c receives the priority class terminal information, as shown in FIG. 6, the main control unit 506 maps, to an N-ISDN signal, the priority class terminal information within the B-ISDN signal message outputted from the B-ISDN signal message control unit 503, and inputs this mapped signal to the N-ISDN signal message control unit 502.

Thus, in the call-in switching equipment 401 within the B-ISDN, the priority class communication information, e.g., "class 1 (the highest priority communication class)" defined as the parameter within the N-ISDN message outputted from the B-ISDN signal message control unit 503, is set to the priority class terminal information "class 1 (the highest class)" defined as the parameter of the N-ISDN message inputted to the N-ISDN signal message control unit 502 under the control of the main control unit 506. The N-ISDN witching equipment 402b conceived as a last call-in station can be thereby notified of the priority class terminal information of the call-out terminal 403a accommodated in the call-out N-ISDN switching equipment 402a, and further a priority class terminal service can be received in the last call-in station, i.e., the N-ISDN switching equipment.

[Embodiment 1]

A more specific embodiment will hereinafter be discussed with reference to the drawings.

Figure 7:
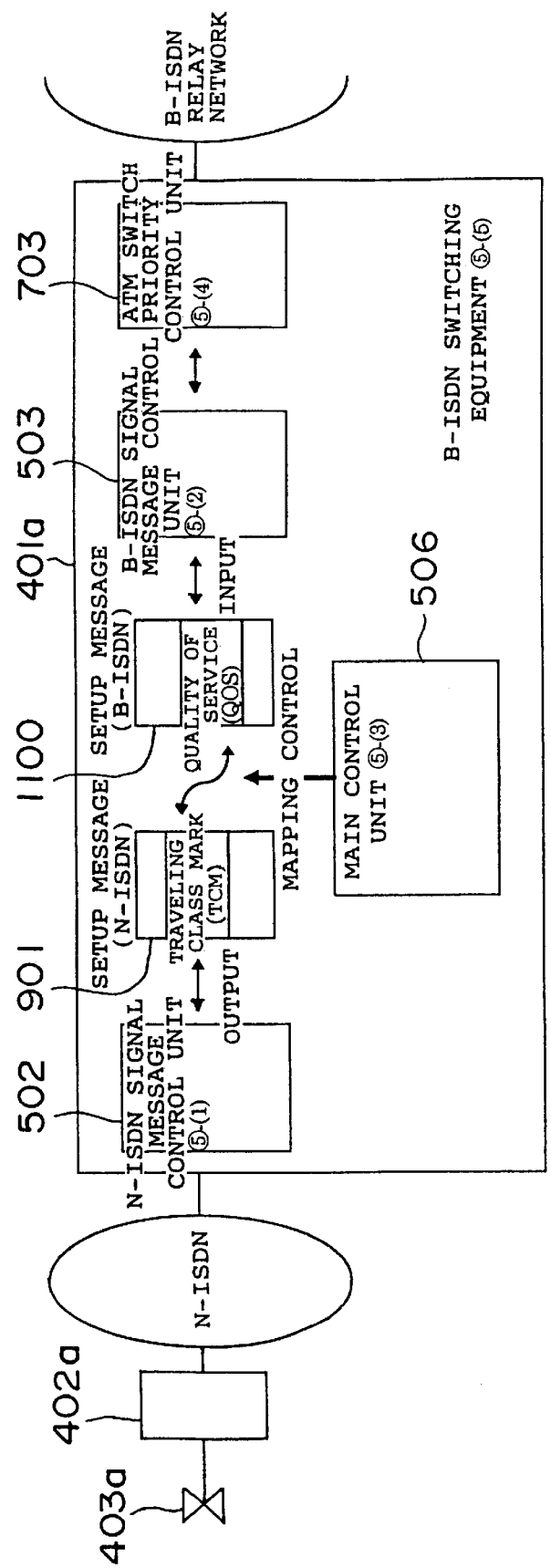
FIG. 7 is a block diagram showing a functional construction within the switching equipment in the embodiment.
Figure 8:
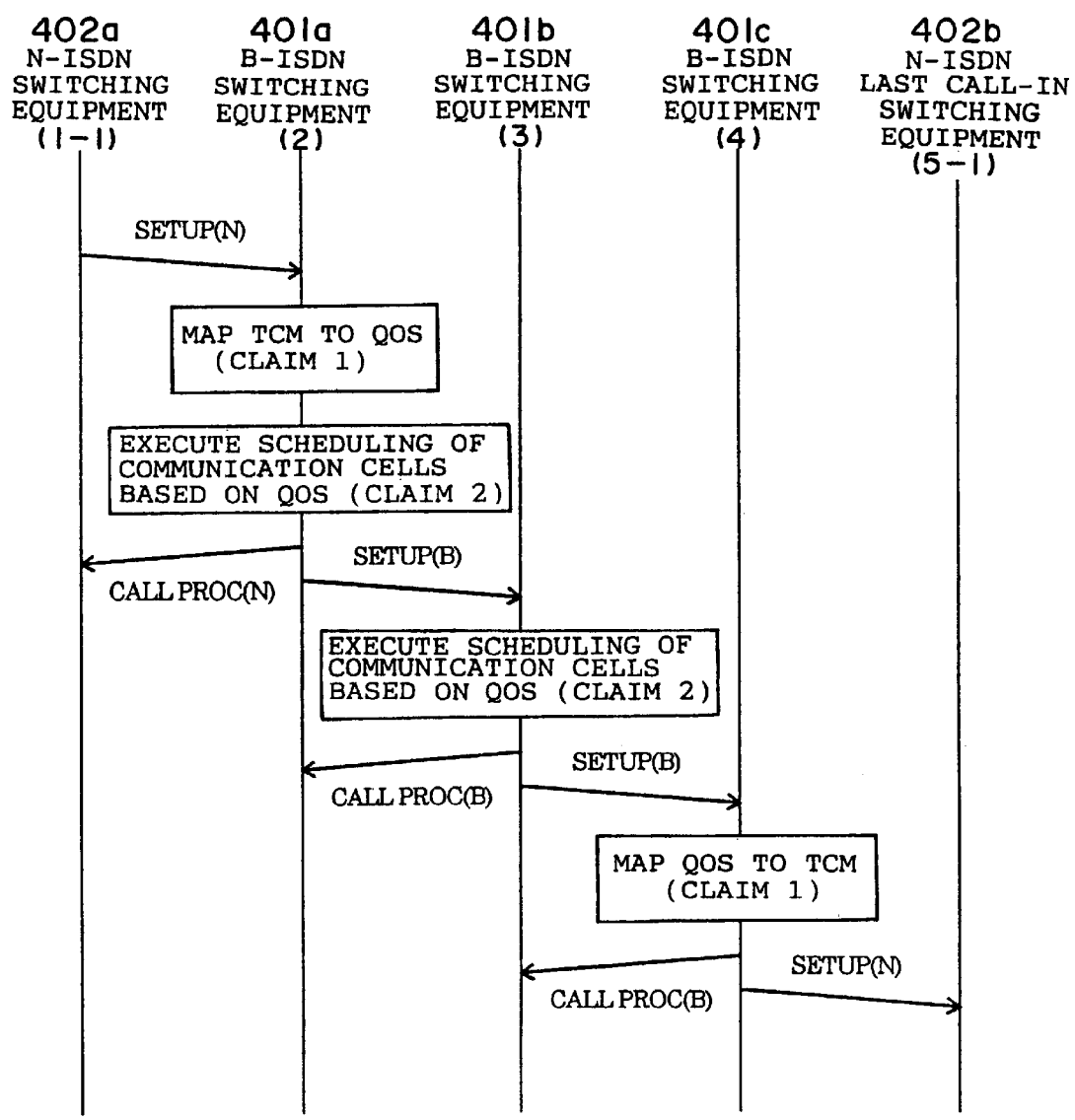
FIG. 8 is a sequence diagram showing a processing procedure between the switching equipments in the embodiment.

FIG. 7 is a diagram showing a construction of the B-ISDN switching equipment in one embodiment of the present invention. FIG. 8 is a sequence diagram of the signal message.

Note that the respective switching equipments in the sequence diagram in FIG. 8 correspond to those explained in FIG. 4. In a SETUP process between those switching equipments, the B-ISDN switching equipment 401a receiving SETUP from the N-ISDN call-out switching equipment 402a extracts a traveling class mark (TCM) out of a SETUP signal and maps this TCM as QOS of the ATM cell. Details thereof will be explained later on referring to FIG. 7. Then, the B-ISDN switching equipment 401a executes a scheduling (a priority transmission) of the communication cells in accordance with this QOS, and transfers the SETUP signal to the next relay switching equipment 401b. Further, in parallel thereto, CALL PROC is transmitted back to the N-ISDN switching equipment 402a.

The B-ISDN switching equipment 401c received the SETUP signal via the relay switching equipment 401b, extracts QOS from the received ATM cell, and maps this QOS to the TCM of the N-ISDN signal. This process will hereinafter be explained. Then, the SETUP signal converted into the N-ISDN signal arrives at the N-ISDN switching equipment 402b conceived as the final call-in station.

Referring to FIG. 7, an N-ISDN signal message control unit 502 incorporates an N/ISDN signal message I/O control function and an analyzing function. A B-ISDN signal message control unit 503 incorporates a B-ISDN signal message I/O control function and an analyzing function. A main control unit 506 has a mapping function with respect to an N-ISDN signal message and a B-ISDN signal message, which are defined as input data. Further, a priority control unit 703 impalements control of assuring a connection band of the ATM switch.

Referring again to FIG. 7, an explanation will be made on the premise that an N-ISDN protocol is accordant with the TTC standard Q.931-a, and a B-ISDN protocol is accordant with the ATM forum (UNI4.0).

To begin with, inter-working from the N-ISDN to the B-ISDN is described.

A call is transmitted from the priority terminal 403a, in which the terminal class "1: special numeral (international transmittable class)" is set, this terminal 403a being accommodated in the call-out station switching equipment in the N-ISDN. The call-out station switching equipment 402a sets a value "1: special numeral (international transmittable numeral)" in the traveling class mark (TCM) of the information element in a code group 5 designated by a fixed shift procedure when editing the SETUP message, and transmits it to the N-ISDN. In the B-ISDN switching equipment 401a, the N-ISDN signal message control unit 502 receives this SETUP message 901 (Q.931-a) and transfers this message as output information to the main control unit 506. The main control unit 506 converts this item of output information into a SETUP message 1100 (ATM forum UNI4.0) and maps this message 1100 to the B-ISDN signal message control unit 503.

Figure 9:
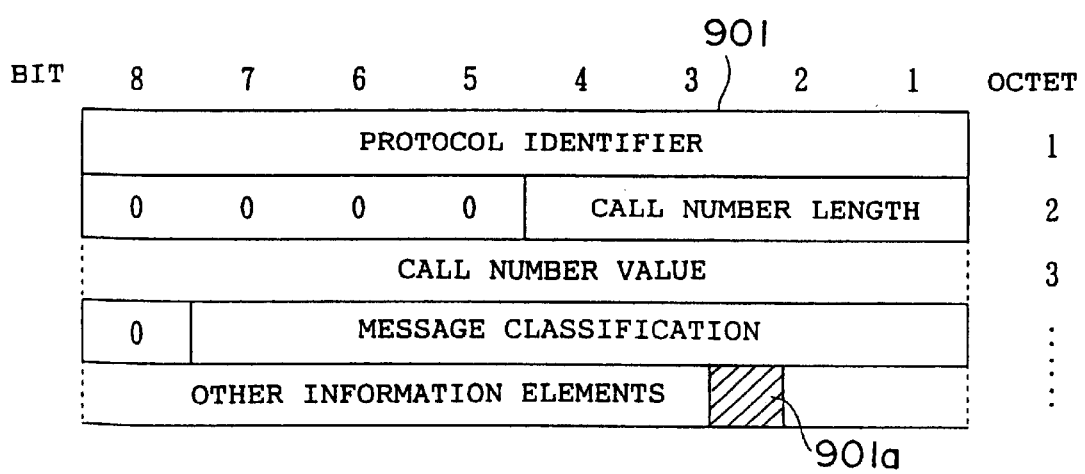
FIG. 9 is a diagram showing a structure of the message format in the N-ISDN.
Figure 10:
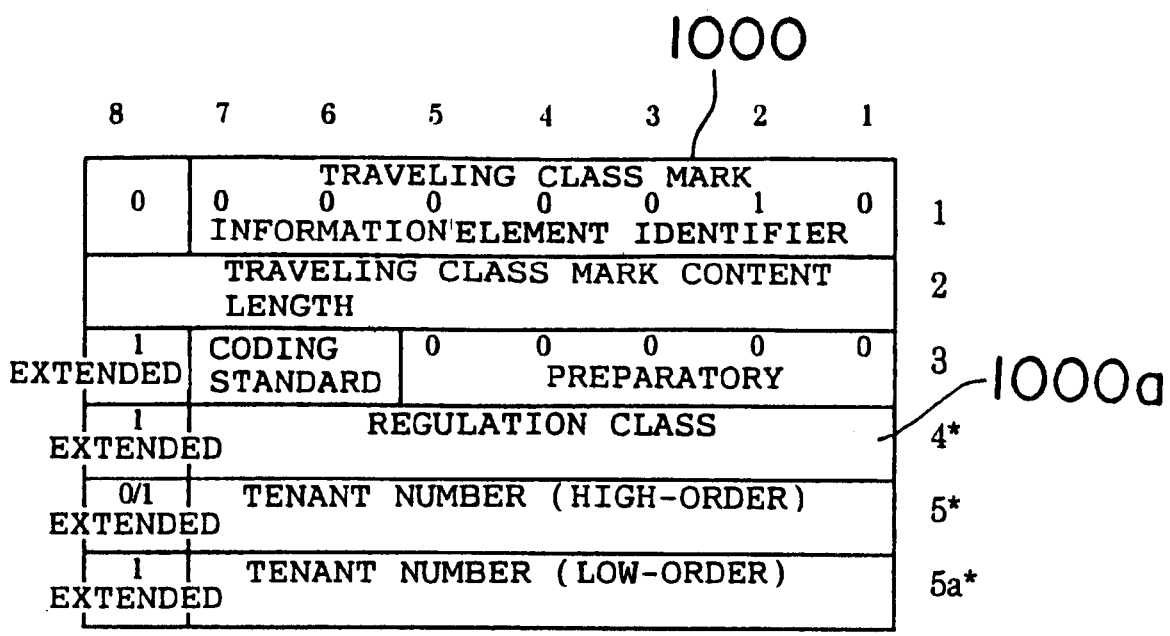
FIG. 10 is a diagram showing a structure of the format (Q.931-a) of a traveling class mark information element in the N-ISDN.

Herein, FIG. 9 shows a format (SETUP) of the N-ISDN signal. FIG. 10 shows a format of the traveling class mark information element (TCM) therein. Namely, the TCM is stored in a segment 901a in "other information element field" in an N-ISDN SETUP format 901. A regulation class 1000a is stored in an octet 4 of this traveling class mark information element (TCM), and, e.g., a regulation class value "1: special numeral (international transmittable numeral)" is registered therein.

Figure 11:
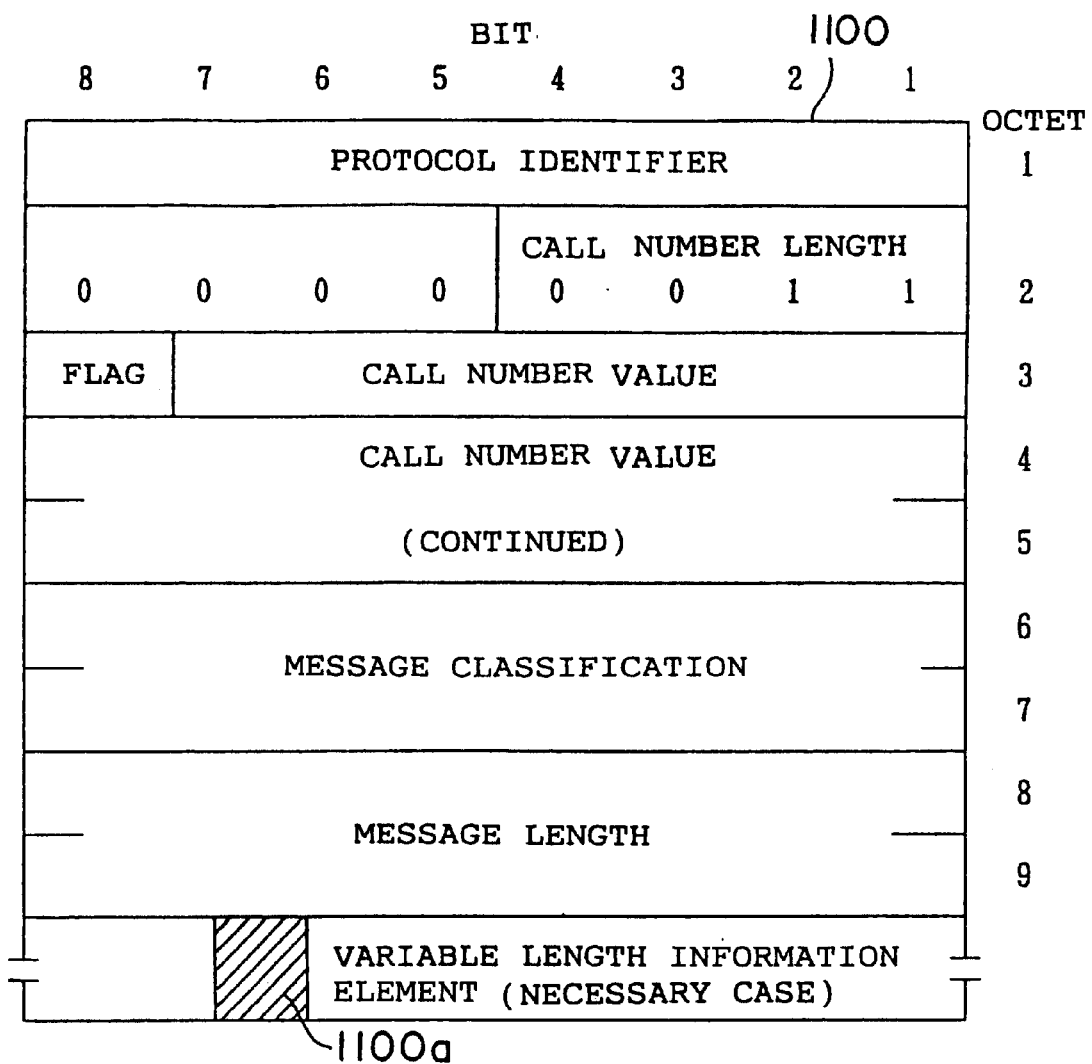
FIG. 11 is a diagram showing a structure of the message format in the B-ISDN.
Figure 12:
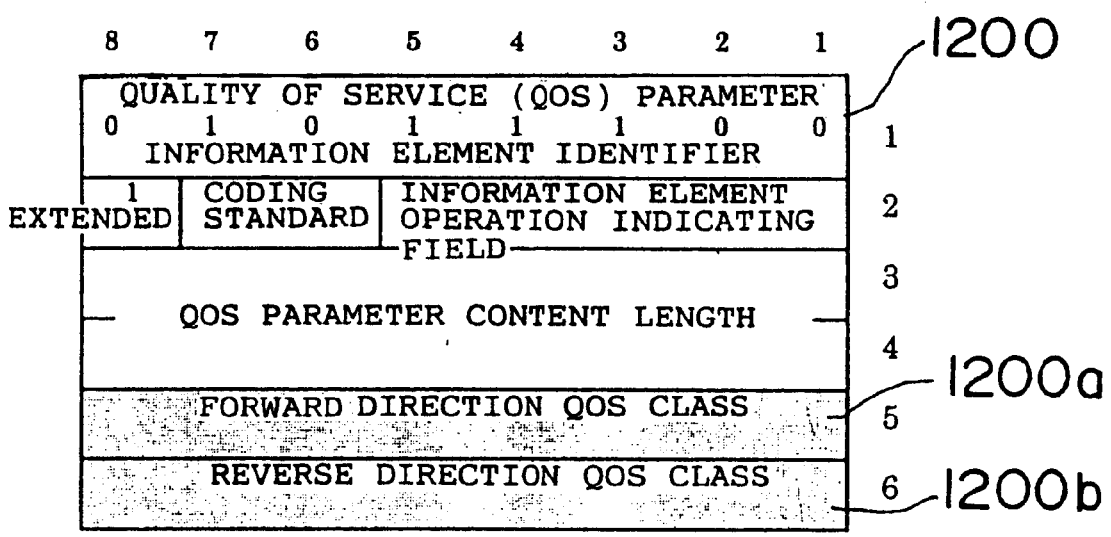
FIG. 12 is a diagram showing a structure of the format (UNI4.0) of a quality-of-service parameter information element in the B-ISDN.

On the other hand, FIG. 11 shows a format (SETUP) of the B-ISDN signal. FIG. 12 shows a format of a QOS information element 1200 therein. That is, the QOS is stored in a segment 1100a in a variable length information element field in a SETUP format 1100 for the B-ISDN. Then, a forward-direction QOS class 1200a is further registered in an octet 5 of a QOS information element 1200, and a reverse-direction QOS class 1200b is registered in an octet 6.

Figure 13:
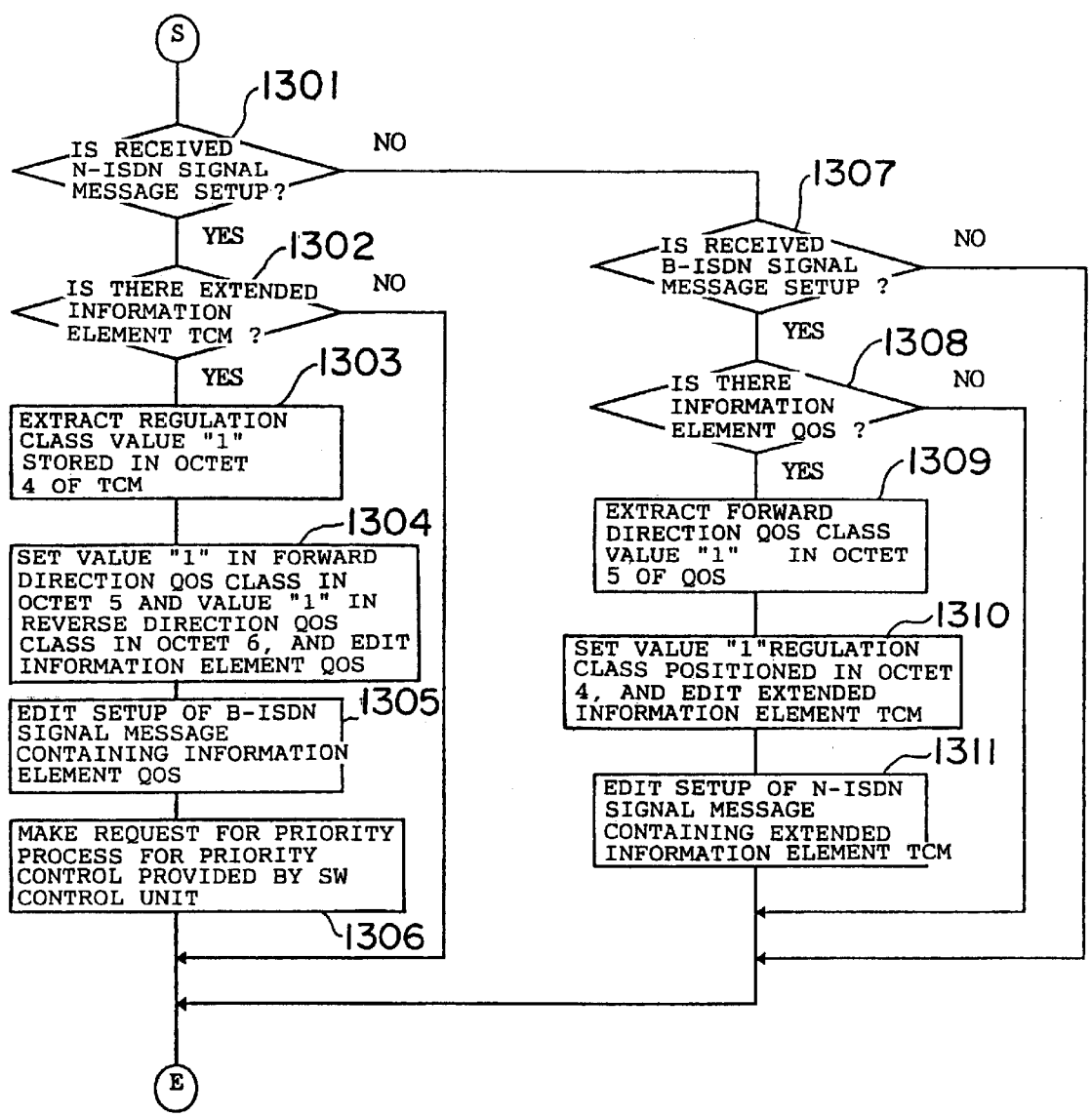
FIG. 13 is a flowchart showing processes in a main control unit in the embodiment.

FIG. 13 shows a processing flow of the main control unit 506 in the switching equipment.

To start with, the main control unit 506 judges whether the received ISDN signal is the N-ISDN signal or the B-ISDN signal, and also judges whether or not this signal is a SETUP signal (steps 1301, 1307).

Then, in the case of SETUP based on the N-ISDN signal, the main control unit 506 shifts to a processes in steps 1302–1306. While on the other hand, in the case of SETUP based on the B-ISDN signal, the main control unit 506 shifts to processes in steps 1307–1311. Hereinafter, the explanation will be given based on a case classification.

(Case of Receiving SETUP in N-ISDN)

At first, the main control unit 506 detects whether or not the traveling class mark information element (TCM) shown in FIG. 10 is stored in the SETUP signal (step 1302).

If the TCM is detected in step 1302, the regulation class value "1: special numeral (international transmittable numeral)" stored in the octet 4 of this TCM is extracted (step 1303).

Next, when editing the QOS information element 1200 (see FIG. 12), a value "1: equi-CBR (videotex)" is registered in the forward direction QOS class defined in an octet 5, and the value "1: equi-CBR (videotex) is registered in the reverse-direction QOS class defined in an octet 6 (step 1304).

Then, the edited QOS information element 1200 is further edited as a SETUP message according to the ATM forum UNI4.0 (step 1305).

Next, the priority control unit 703 is requested to execute a priority process of the same SETUP message (step 1306).

In a series of those processes in steps 1302–1306, the band can be preferentially ensured in the relevant communications by designating the QOS of the SETUP message in the B-ISDN relay network. Further, if the priority control is permitted in the ATM switch of the B-ISDN switching equipment, the band can be preferentially ensured.

(Case of Receiving SETUP in B-ISDN)

When the B-ISDN signal message control unit 503 receives the SETUP message (pursuant to ATM forum UNI4.0) given from the B-ISDN relay network, the main control unit 506 converts this message into a SETUP message (Q.931-a) and maps it to the N-ISDN signal message control unit 502.

At this time, to start with, the main control unit 506 detects the QOS information element 1200 (see FIG. 12) from the SETUP message in the B-ISDN (step 1308).

If this QOS information element 1200 is detected, a forward-direction class value "1: CBR device (videotex)" stored in the octet 5 thereof is extracted (step 1309).

Next, the traveling class mark information element (TCM) is edited, and the value "1: special numeral (international transmittable numeral)" is registered in the regulation class defined in the octet 4 (step 1310).

Next, the traveling class mark information element (TCM) edited in step 1310 is registered in the SETUP message (see FIG. 9) of the N-ISDN signal (step 1311).

The last call-in switching equipment can be notified of the "call-out from priority terminal" by use of the TCM in the SETUP message also in the N-ISDN through a series of processes in steps 1308–1311, and the last call-in switching equipment becomes capable of implementing the priority service.

[Embodiment 2]

Figure 14:
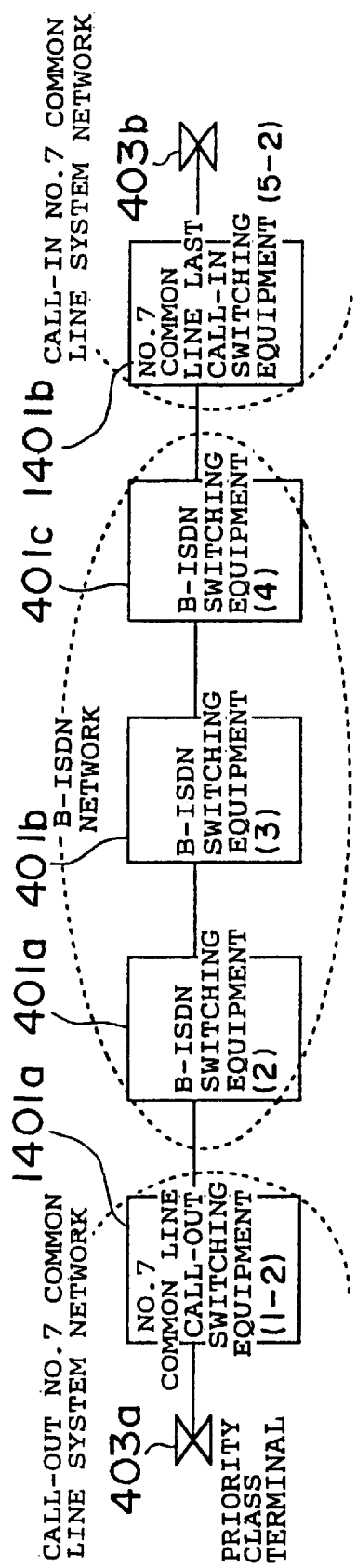
FIG. 14 is a block diagram showing network constructions of a No.7 common line system network and of the B-ISDN in the embodiment.

Next, referring to FIG. 14, there will be described another embodiment in which the No.7 common line system protocol is based on the TTC standard Q.763 and the B-ISDN protocol is based on the ATM forum (UNI4.0). Referring again to FIG. 14, there are shown a call-out priority class terminal 403a, a No.7 common line call-out switching equipment 1401a, B-ISDN relay switching equipments 401a, 401b and 401c, a No.7 common line last call-in switching equipment 1401b, and a call-in terminal. Note that an internal configuration of the B-ISDN relay switching station is substantially the same as the one explained in FIG. 7, and is therefore explained with reference to FIG. 7 as a substitute.

Further, FIG. 16 shows an example of a call-out user classification parameter utilized in an IAM message (Q.763) used in the No.7 common line system.

(Case of No.7 Common Line System Network→ISDN)

To begin with, upon a call-out from the priority terminal 403a in which the terminal class "1: special numeral (international transmittable numeral)" is set, this terminal 403a being accommodated in the call-out switching equipment 1401a in the No.7 common line system relay network, the call-out switching equipment 1401a sets a value "11: priority call-out user (00001011) in an item of the call-out user classification parameter defined in the octet 5 when editing the IAM message, and transmits this value to the No.7 common line system relay network. In the B-ISDN relay switching equipment 401a on the receiving side, the No.7 common line system signal message control unit similar to the control unit 502 shown in FIG. 7 receives the above value, and the main control unit 506 converts the output information into a SETUP message (ATM forum UNI4.0), and maps this message to the B-ISDN signal message control unit 503. Herein, the processing flow of the main control unit 506 is substantially the same as the flow in steps 1303–1306 in FIG. 13. Namely, the main control unit 506 extracts the value "11: priority call-out user" from the call-out user classification, and, when editing the QOS of the SETUP message in the B-ISDN, registers the value 37 1: equi-CBR (videotex) in the forward direction QOS class (1200a) defined in the octet 5 (FIG. 12) as well as registering the value "equi-CBR (videotex)" in the reverse direction QOS class defined in the octet 6, thus editing the SETUP message according to the ATM forum UNI4.0 . Herein, it is a general practice that the ATM switch provides the switch user with the priority control, and hence the priority control unit 703 is requested to execute the priority process in the present communications.

The band can be preferentially ensured in the relevant communications by designating the QOS of the SETUP message through the above process in the B-ISDN relay network, and the band can be also preferentially ensured by the priority control function in the ATM switch of the B-ISDN switching equipment 401a.

(Case of B-ISDN→No.7 Common Line System Network)

In the B-ISDN switching equipment 401c , the B-ISDN signal message control unit 503 receives the SETUP message (ATM forum UNI4.0) from the B-ISDN relay network and transfers this message as the output information to the main control unit 506. The main control unit 506 converts this item of output information into an IAM message (Q.763) and maps this message to the No.7 common line system signal message control unit (corresponding to the control unit 502 in FIG. 7).

The main control unit 506 extracts the value "1: equi-CBR (videotex)" from the forward direction QOS class defined in the octet 5. Then, the value "11: priority call-out user" is registered in the item of call-out user classification in the IAM message, and the IAM message based on the Q.763 is edited.

The last call-in switching equipment (1401b) can be notified of the "call-out from priority terminal" by designating the call-out user classification in the IAM message in the No.7 common line system relay network through the above process. The last call-in switching equipment 1401b can implement the priority service concerned.

[Embodiment 3]

Figure 17:
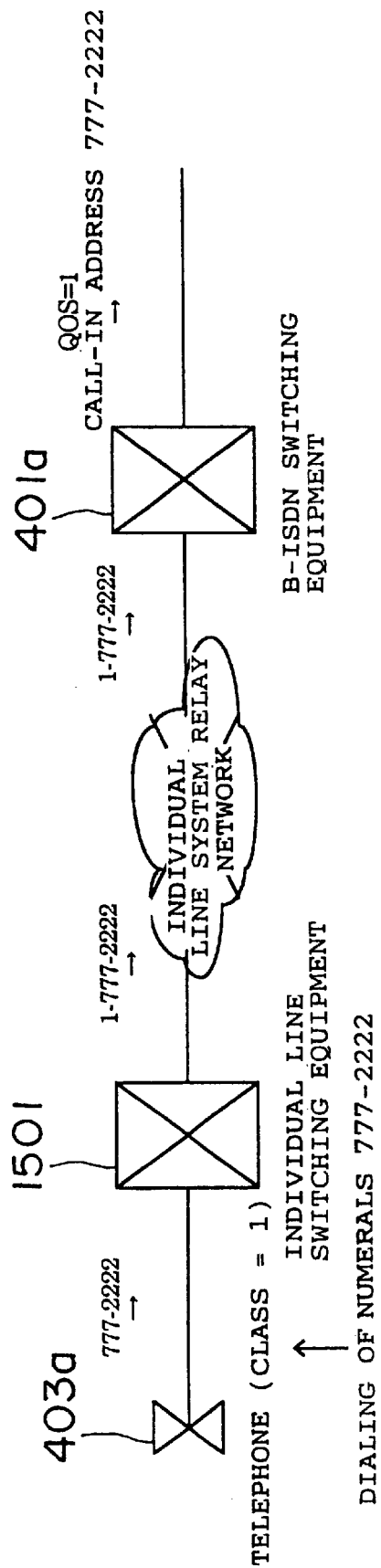
FIG. 17 is an explanatory block diagram showing a concept for conveying a priority information call-out using a special numeral between the individual line system network and the B-ISDN in the embodiment.
Figure 18:
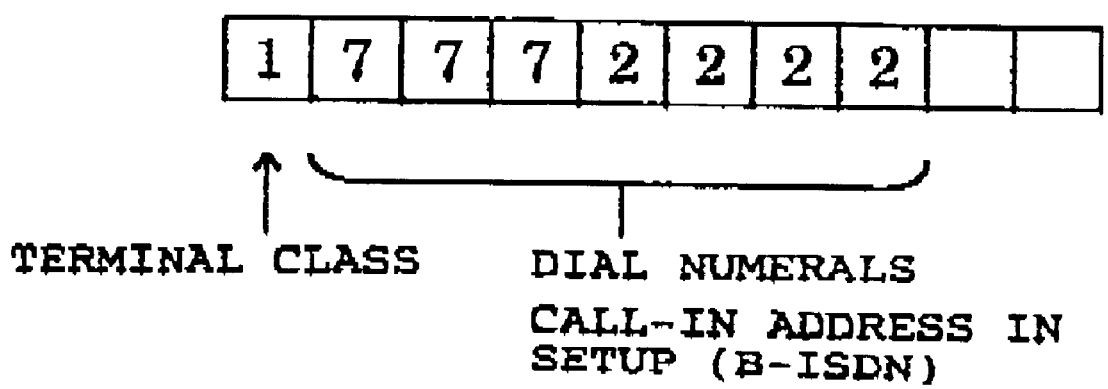
FIG. 18 is an explanatory diagram showing a content of a dial number when in the individual line system.

Next, still another embodiment will be explained with reference to FIGS. 15, 17 and 18, wherein a notification of the terminal class information is made by utilizing a numeral sending function based on a PB signal in an individual line system, and the B-ISDN protocol is accordant with the ATM forum (UNI4.0).

Figure 15:
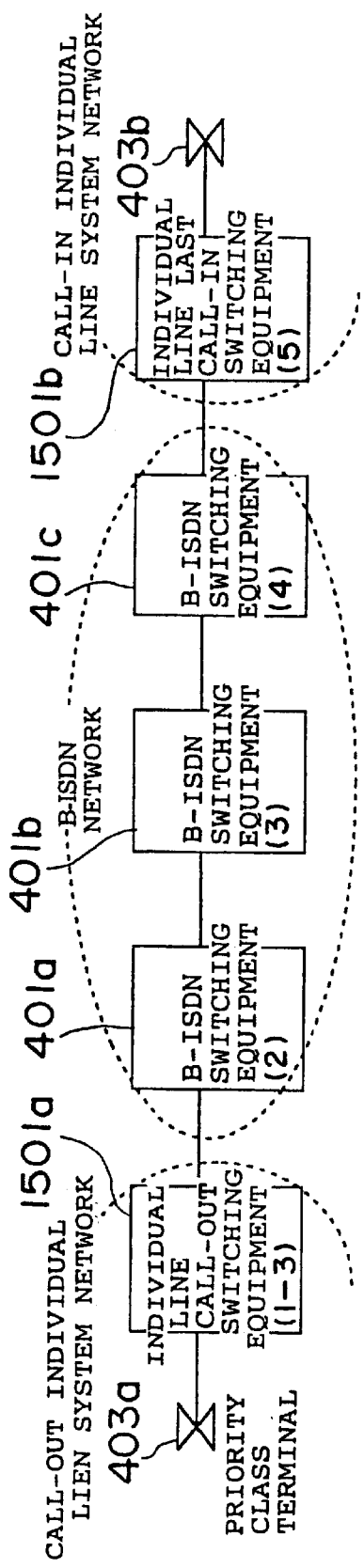
FIG. 15 is a block diagram showing network constructions of an individual line system network and of the B-ISDN in the embodiment.

Referring to FIG. 15, there are shown a call-out priority class terminal 403a, an individual line call-out switching equipment 1501a, B-ISDN relay switching equipments 401a, 401b and 401c, an individual line last call-in switching equipment 1501b, and a call-in terminal 403b. Note that an internal configuration of the B-ISDN relay switching station is substantially the same as the one explained in FIG. 7 and therefore described referring to FIG. 7 as a substitute.

(Case of Individual Line System Network→ISDN Network)

A call is transmitted from the priority terminal 403a in which the terminal class "1: special numeral (international transmittable numeral)" is set, this terminal 403a being accommodated in the call-out switching equipment 1501a in the individual line system network. The call-out switching equipment 1501a has the numeral sending function by the PB signal. The call-out switching equipment 1501a sets a first digit of a dial number in the terminal class value "1: special numeral (international transmittable numeral)" and transmits it to the individual line system relay network. FIG.

18 shows a structural content of the dial number in this case. Referring to FIG. 18, "777-2222" is dialed in the call-out terminal 403a. In the call-out switching equipment 1501a, however, "1" is added to the head of the above dial number, and therefore "1-777-2222" is transmitted to the individual line system relay network.

In the B-ISDN switching system 401a, an individual line system signal message control unit (corresponding to the control unit 502 in FIG. 7) receives the dial number containing the terminal class value given from the individual line system relay network, and transfers this dial number as output information to the main control unit 506. The main control unit 506 converts this item of output information into a SETUP message (ATM forum UNI4.0), and maps this message to the B-ISDN signal message control unit 503. Herein, a processing flow by the main control unit 506 is substantially the same as the one in steps 1303–1306 in FIG. 13.

Namely, the main control unit 506 extracts the value "1: special numeral (international transmittable numeral)" from the terminal class defined in the first digit of the dial number received. Then, when editing the QOS of the B-ISDN message, the main control unit 506 registers the value "1: equi-CBR (videotex) in the forward direction QOS class defined in the octet 5, and further registers the value "1: equi-CBR (videotex)" in the reverse direction QOS defined in the octet 6, thus editing the SETUP message according to the ATM forum UNI4.0.

Herein, it is a general practice that the ATM switch provides the switch user with the priority control, and hence the main control unit 506 requests the priority control unit 703 to execute the priority process in the present communications.

The band can be preferentially ensured in the relevant communications by designating the QOS of the SETUP message through the above process in the B-ISDN relay network, and the band can be also preferentially ensured by the priority control function in the ATM switch of the B-ISDN switching equipment 401a.

(Case of B-ISDN→Individual Line System Network)

In the B-ISDN switching equipment 401c, the B-ISDN signal message control unit 503 receives the SETUP message (ATM forum UNI4.0) from the B-ISDN relay network and transfers this message as the output information to the main control unit 506.

The main control unit 506 converts this item of output information into dial numeral data and maps this piece of data to the individual line system signal message control unit (corresponding to the control unit 502 in FIG. 7).

Namely, the main control unit 506 extracts the value "1: equi-CBR (videotex)" from the forward direction QOS class (FIG. 12) defined in the octet 5 of the SETUP message in the B-ISDN. Then, when editing the dial number, the value "1: special numeral (international transmittable numeral)" is registered in the terminal class defined in the first digit, and then transferred to the individual line system signal message control unit (corresponding to the control unit 502 in FIG. 7). The QOS of the B-ISDN is thereby converted into the dial number in the PB signal format, and the last call-in switching equipment can be notified of the "call-out from the priority terminal" in the individual line system relay network and is capable of implementing the priority service.

According to the present invention, the transmission of the priority information can be actualized effectively with the simple construction between the two kinds of networks having different protocols. The transmission of the "priority terminal information", which has been actualized in the N-ISDN and in the No.7 common line system relay network, can be also executed in the relay network with a co-existence of the B-ISDN.

It is apparent that, in this invention, a wide range of different working modes can be formed based on the invention without deviating from the spirit and scope of the invention. This invention is not restricted by its specific working modes except being limited by the appended claims.

What is claimed is:

1. A switching equipment capable of transferring priority information, for relaying over first and second networks having different protocols. comprising:

a receiving message control unit for extracting priority information of a call-out terminal from a first message format received from said first network;

a main control unit for converting the priority information obtained from said receiving message control unit into a second message format; and a transmitting message control unit for transmitting to said second network the priority information converted into the second message format by said main control unit, wherein said first network is an N-ISDN, the priority information is call-out terminal regulation class information based on Q.931-a, said second network is a B-ISDN, and the priority information after being converted is a QOS class prescribed in an ATM forum (UNI4.0).

2. A switching equipment capable of transferring priority information according to claim 1, wherein said first network is a B-ISDN, the priority information is a QOS class prescribed in an A/TM forum (UNI4.0), said second network is an N-ISDN, and the priority information after being converted is call-out terminal regulation class information based on Q.9.931-a.

3. A switching equipment capable of transferring priority information according to claim 1, wherein said first or second network is a B-ISDN, the priority information before or after being converted is a QOS class prescribed in an ATM forum (UNI4.0), said second or first network is a No.7 common line system relay network, and the priority information before or after being converted is a call-out user priority parameter.

4. A switching equipment capable of transferring priority information according to claim 1, wherein said first or second network is a B-ISDN, the priority information before or after being converted is a QOS class prescribed in an ATM forum (UNI4.0), said second or first network is an individual line system network, and the priority information before or after being converted is a dial to which a special numeral is added.

5. A priority connecting method of relaying over N-ISDN and B-ISDN networks, comprising:
   a step of judging whether or not there is priority information of a call-out terminal from a first message format received from said N-ISDN network, wherein the priority information is call-out terminal regulation class information based on Q.931-a;
   a step of registering, when the priority information is detected, the priority information in a second message format for a call-out to said B-ISDN network; and
   a step of editing the second message format containing the priority information converted to a QOS class prescribed in an ATM forum (UNI4.0) and sending this format to said B-ISDN network.

6. A priority connecting method according to claim 5, further comprising:
   a step of making a request for a priority connection within a switching equipment.

* * * * *